United States Patent

Pretorius et al.

[15] 3,703,798
[45] Nov. 28, 1972

[54] RELATING TO THREE-DIMENSIONAL CHROMATOGRAPHIC SYSTEMS

[72] Inventors: Victor Pretorius, "Klein Waterkloof," Club Avenue, Waterkloof, Pretoria, Transvaal; Hans Helmut Hahn, 38, Marais Street, Bailey's Muckleneuk, Pretoria, Transvaal, both of Republic of South Africa

[22] Filed: Aug. 4, 1967

[21] Appl. No.: 658,545

Related U.S. Application Data

[63] Continuation-in-part of Ser. No. 548,900, May 10, 1966, and a continuation-in-part of Ser. No. 598,365, Dec. 1, 1966.

[30] Foreign Application Priority Data

Aug. 5, 1966 South Africa ............. 66/4669

[52] U.S. Cl. ........................................... 55/67
[51] Int. Cl. ........................................... B01d 15/08
[58] Field of Search ..210/31, 31 C, 198, 198 C, 285, 210/286; 55/67, 197, 386, 474; 73/23.1

[56] References Cited

UNITED STATES PATENTS

| | | | |
|---|---|---|---|
| 3,347,020 | 10/1967 | Van Venrooy | 55/67 |
| 3,357,158 | 12/1967 | Hollis | 55/67 |
| 2,416,482 | 2/1947 | Holmes | 55/197 |
| 2,869,672 | 1/1959 | Findlay | 55/67 X |
| 3,069,897 | 12/1962 | Sanford | 55/67 X |
| 3,078,647 | 2/1963 | Mosier | 55/197 |
| 3,250,058 | 5/1966 | Baddour | 55/67 |

Primary Examiner—J. L. DeCesare
Attorney—I. William Millen

[57] ABSTRACT

Elution in three-dimensional chromatographic systems is carried out in a direction of increasing cross-section. This is achieved with specially constructed apparatus or with columns modified by internals prescribing a path of ever increasing cross-section. A continuous elution based on improved sample introduction by impregnating a porous section containing a retarding phase with the sample and displacing the section into a position in advance of the separating system proper.

37 Claims, 17 Drawing Figures

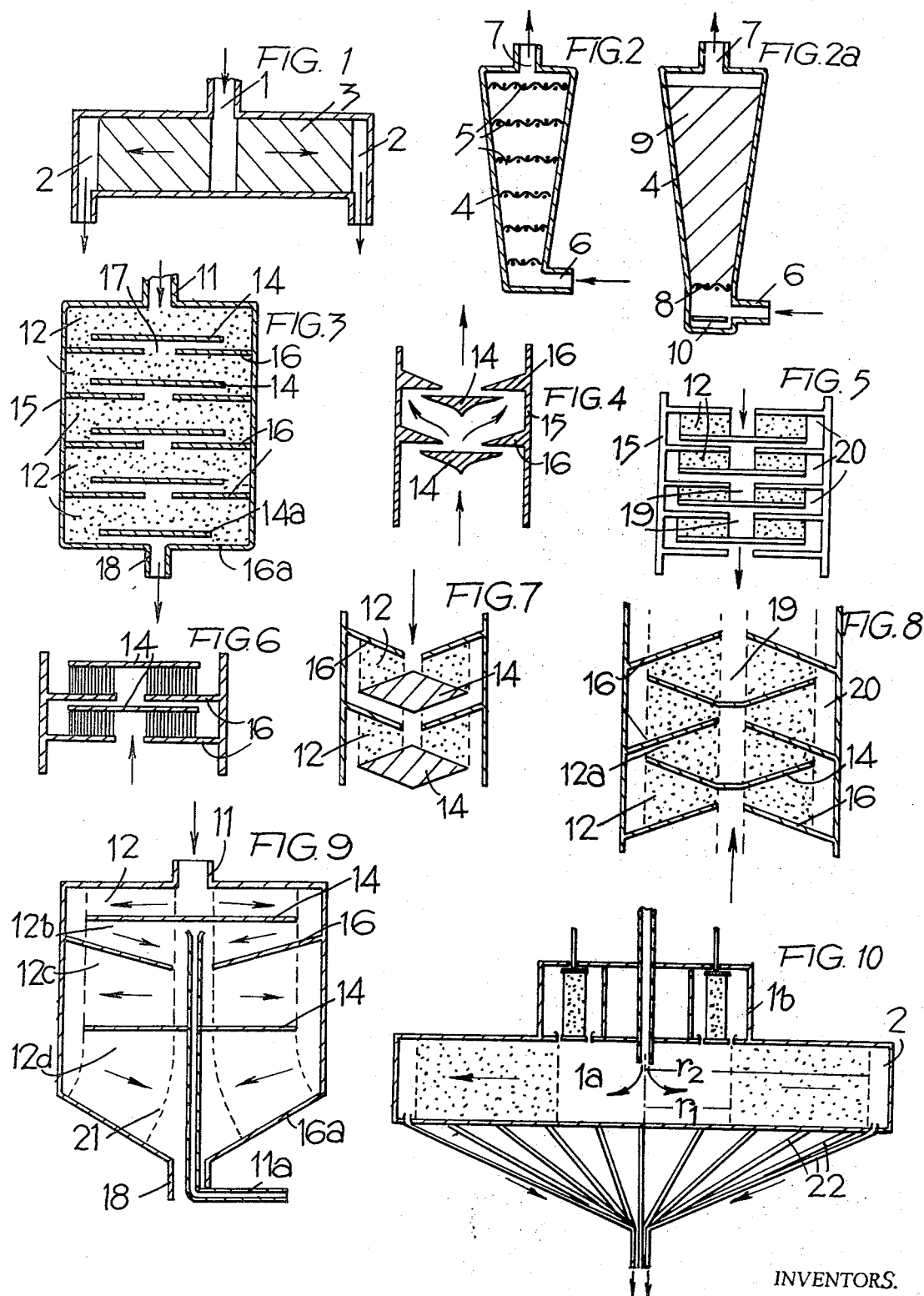

INVENTORS.
VICTOR PRETORIUS
HANS HELMUT HAHN

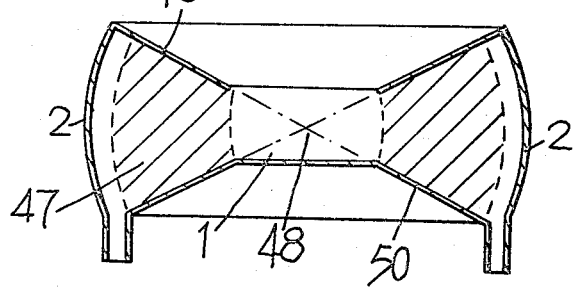
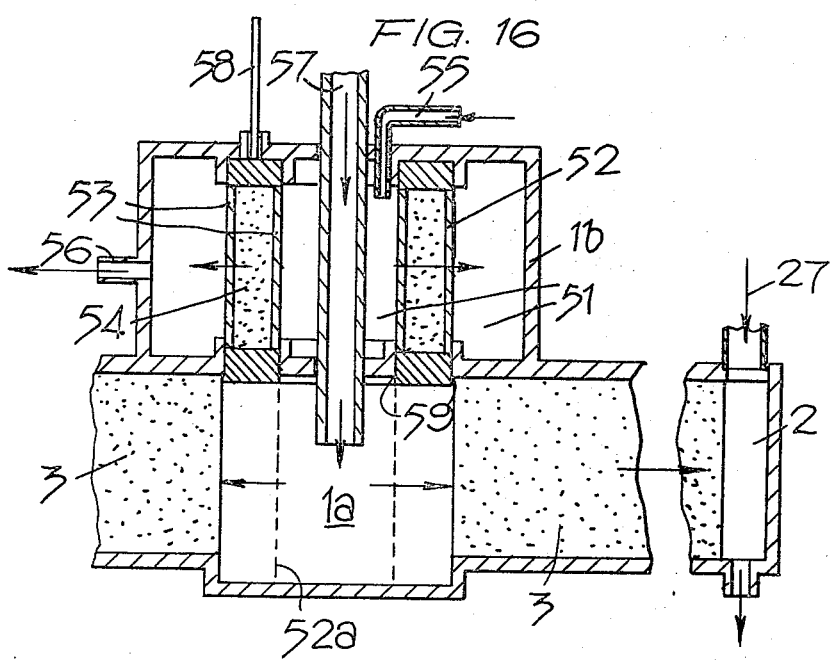
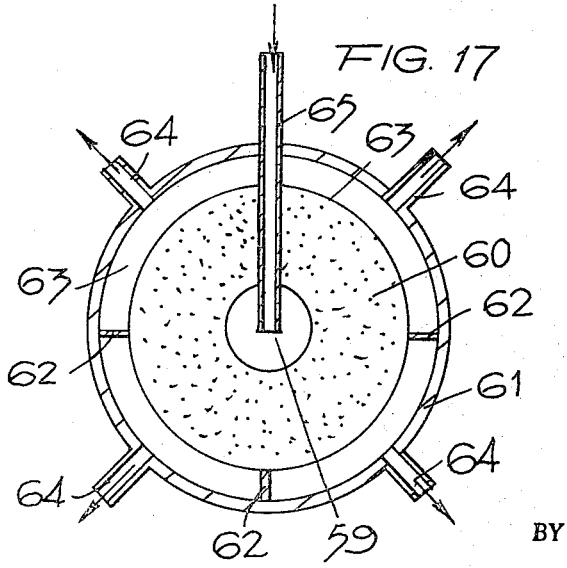

RELATING TO THREE-DIMENSIONAL CHROMATOGRAPHIC SYSTEMS

CROSS-REFERENCES TO RELATED PENDING APPLICATIONS.

This is a continuation-in-part of Ser. No. 548,900 filed May 10, 1966 and entitled "IMPROVEMENTS RELATING TO CHROMATOGRAPHY" and Ser. No. 598,365 filed Dec. 1, 1966 entitled "APPARATUS FOR DISTRIBUTION SEPARATION PROCESSES, THEIR MANUFACTURE AND USE."

Also relevant is the disclosure of Ser. No. 583,788 filed Oct. 3, 1966 entitled "DETECTION METHOD AND APPARATUS;" Ser. No. 657,815 filed Aug. 2, 1967, entitled "CHROMATOGRAPHIC SEPARATION," Ser. No. 657,804 filed Aug. 2, 1967 entitled "IMPROVEMENTS RELATING TO DETECTION IN CHROMATOGRAPHY", Ser. No. 659,632 filed Aug. 10, 1967, entitled "IMPROVEMENTS IN CHROMATOGRAPHIC PROCESSES AND APPARATUS."

BACKGROUND OF THE INVENTION.

The present invention relates to improvements in chromatography, in particular to chromatography carried out in packed beds or their equivalent, i.e., essentially three-dimensional systems as against typical very thin film and paper chromatography which for the purposes of this discussion may be described as essentially two-dimensional systems or capillary chromatography in which one endeavors to approach as nearly as practical a unidimensional system.

Chromatography in three-dimensional systems as above explained is normally carried out in columns the average cross-sectional area of which remains essentially constant in the direction of flow. In principle this statement even holds true for large scale columns with built-in baffles, so-called "internals," where in some cases localities of constriction may alternate with localities of expansion, the nett result still being a column of on the average constant cross-sectional area in the direction of flow.

A generally accepted and much practiced expedient, particularly in research and routine laboratories, e.g., working in the fields of hydrocarbon chemistry, has been to employ consecutive column sections of decreasing cross-sectional area in the direction of flow of the developing (material forwarding) phase, i.e., in normal batch separations the mobile phase. This expedient has always been believed to lead to better defined separations and can, under certain circumstances have some merit when applied, as is often done, to displacement chromatography. We have now come to the conclusion that this approach can have fundamental shortcomings, particularly if one were to apply the concept to elution chromatography. At best such columns of decreasing cross-sectional area can avoid in the narrower portions some of the band spreading inherent in conventional columns of large diameter due to non-planar flow profiles. The narrower column portions can hardly, if at all, undo the band spreading which has already taken place in the portions of larger diameter. In accordance with our findings, the system just discussed cannot possibly lead to the elution of bands with better definition than that achieved with a column of the same length containing the same packing and having the narrow cross-section throughout, provided of course that overloading is avoided.

The invention aims at the achievement of improved separations in chromatography, and in particular when carried out on a preparative scale.

The invention further provides an inlet device designed to overcome or mitigate problems of band-spreading arising during the sample introduction and particularly in the context of certain embodiments incorporating the main features of the present invention.

SUMMARY OF THE INVENTION

The process in accordance with the invention comprises carrying out a chromatographic separation in an essentially three-dimensional separating medium comprising the retarding phase, development of the chromatogram being carried out by feeding the forwarding phase in a direction in which on the average there is a nett increase of cross-sectional area occupied by the retarding phase.

According to some embodiments said cross-sectional area may increase in the direction of development throughout the system, preferably continuously.

It is also possible for the system to be subdivided into several sections connected in series, consecutive sections comprising either the same or different separating media, e.g., packings. Consecutive sections may differ with regard to the separating media in respect of the retarding phase itself and/or in respect of the texture, pore size, porosity and like physical features of the medium which either itself serves as the retarding phase (being for example an adsorbent or an ion exchanger) or serves as a support for a retarding phase.

It is possible but not essential for said cross-sectional increase to continue from one of said sections to the next. According to other embodiments each of two or more consecutive sections commences with a relatively small cross-section and terminates in the direction of chromatographic development with a larger cross-section.

It is also possible for one or more sections in a system as defined to be of constant cross-section or even (although such should be avoided whenever possible) have a cross-section which for some practical reason decreased somewhat in the direction of development as long as the eventual nett result is that of a cross-section increase.

The nett increase in cross-section, depending on the circumstances of each individual case may produce one or more advantageous effects. It can be an advantage that the linear rate of advance of the bands relative to the linear rate of flow of the forwarding phase in respect of the retarding phase increases. This will be so because for any given pair of retarding phase and forwarding phase, other conditions being equal, the ratio of the effective volume of retarding phase passed through by a band to the volume of developing phase passed beyond the band is a constant for such band.

Most important of all, however, a compression of the bands is attainable which under favorable conditions may result in considerably improved separations in some cases even with shortened lengths of the separating medium in the direction of development as compared with a similar conventional system. In other words, when carrying out the process with a column type of apparatus it becomes possible to achieve substantially decreased theoretical plate heights.

In principle the invention is applicable to virtually all kinds of chromatography which are normally carried out in columns, both liquid and gas chromatography, both batchwise and continuous, but in particular of the elution type.

Any increase in cross-sectional area must be accompanied by a corresponding decrease of the linear flow velocity of the developing phase. The separating power (theoretical plate height) in a given system is, however, critically dependent on such flow velocity in certain flow regions. Care will, therefore, have to be taken to ensure that the velocity in all parts of the system is compatible with an acceptable separating power.

When operating within the velocity range of laminar flow, the velocity must not be allowed to drop anywhere below the limit beyond which diffusion in the direction of flow becomes the factor controlling the separating power. For higher velocities the teachings of our applications Ser. No. 548,900 filed May 10, 1966 and Ser. No. 659,632, filed Aug. 10, 1967 are pertinent.

To compensate for an excessive drop in velocity and separating power it is possible to inject additional forwarding phase between successive sections of increasing cross-sectional area in the direction of flow. The resulting velocity boost will, of course, be accompanied by a corresponding dilution of the bands. This in turn may allow the use in the particular section of a retarding phase having a lower capacity but improved separating power under the particular dilute conditions. On the other hand the injection of forwarding phase may also be used to change the composition of the forwarding phase for optimalized conditions in the section to follow. Such modification of the composition of the forwarding phase between successive sections may be programmed to coincide with particular stages in the development of the chromatogram.

Similarly temperature programming or the programming of any other condition may be resorted to for the individual sections to optimalize conditions.

Different kinds of packings have different velocity ranges in which their separating powers are acceptable or optimal. This fact may be utilized to adapt the packing in different parts of the system to the prevailing velocity ranges.

Wherever the velocity limitations are critical the ratio of maximum to minimum cross-section in any one section has to be limited accordingly.

Another factor which can constitute a limitation resides in velocity profile effects which tend to become more disturbing as the cross-section increases. The invention provides for various means by which these effects may be wholly or partly counteracted.

Firstly, the packings employed are preferably of a type affording an integral coherent body having a statistically uniform pore structure. Channelling effects and irregular velocity profiles are thus eliminated. Moreover these packings can be made substantially devoid of a zone of transgression in the vicinity of the apparatus walls thereby reducing wall effects to a minimum. Such packings may, for example, be synthetic resin foams of perfectly open pore structure, if necessary coated with a suitable protective layer, glass foams of substantially similar structure or slag foams. Similarly useful structures are obtainable by aerating suitable powders to bring them into an expanded state substantially corresponding to the physically defined meta-stable condition of loosest packing and fixing the particles in that condition by sintering or adhesive action. These packings form the subject of our application Ser. No. 598,365 filed December, 1966.

Substantially the same uniformity leading to quite flat velocity profiles is attainable when a bed of powder comprising the retarding phase is maintained in the just described loosened up condition by the flow of the forwarding (developing) phase. The uniform maintenance of this condition may be assisted by vibration, the flow of developing phase being sufficient to prevent the collapsing of the bed to a loosely settled state. Alternatively the powder may be maintained by the forwarding phase in a fluidized bed condition, i.e. with the powder particles in turbulent motion whilst measures are taken to prevent the free movement of the particles beyond spaced apart obstructions placed across the direction of flow of the developing phase. These obstructions may take the form of grids or they may be produced by sound or ultrasonic vibrations producing standing waves in the direction of flow, the powder containing particles of a size adapted to become concentrated and held in the nodes of the waves.

Applying the principles of the aforesaid paragraph to the present invention, the process is carried out in an apparatus comprising a vertical column or column sections each tapering such that the bottom end comprising the bed support is of smaller cross-section than the upper end, being on the outlet side. By this an additional advantage may be attained in that the taper may be designed to compensate for the pressure gradient in the bed and the barometric head at each level of the superimposed powder, such that a uniform degree of aeration may be attained at all levels of the bed.

The various teachings of our application Ser. No. 548,900 filed May 10, 1966 relating in general to the employment of powder columns in a condition more porous than their loosely settled state, including the technique for continuous operation may also be applied to the preceding paragraph, it being understood that the feature of turbulence in the developing phase is optional in the context of the present application.

Considerable uniformity of packing resulting in a reduction of adverse streaming profile effects is also attainable in columns of increasing cross-section by allowing aerated powders to collapse completely to the loosely settled state. In many cases the uniformity thus attainable will be adequate for the purposes of the present invention.

Another expedient, partly inherent in some of the techniques just discussed, but also applicable to other types of bed, is the provision of adequate, preferably complete mixing of the developing phase transverse to its direction of flow, either continuously or from time to time. Such transverse mixing may result from turbulence in the developing phase. It is also attainable by mixing devices, e.g. constrictions provided, e.g., by column internals.

It is believed that at least part of the beneficial results of the invention may be due to the partial elimination of transverse diffusion effects. The said cross-sectional increase may be in one dimension only, or, in view of the aforesaid considerations more advantageously two-dimensionally. In the former case the flow line pattern will be radial in respect of an axis when viewed normal to such axis, whilst in the other case it will be radial three-dimensionally relative to a point. From a theoretical point of view the ideal will be to carry out chromatography radially outwards from the center of a complete sphere uniformly towards its periphery, thus eliminating completely any wall effects.

The principles of the present invention are also applicable to electrochromatography in which a potential or potential gradient is applied to a packing thereby to determine the distribution constants for the solutes.

The scope of the invention is also intended to include apparatus for carrying out the process, many features of which are already apparent from the above and require no repetition.

Quite generally an apparatus in accordance with the invention comprises an inlet region for a chromatographic forwarding phase, an inlet for material to be separated integral with or separate from the said inlet region, an outlet region, a space filled with a three dimensional substantially porous separating medium comprising a retarding phase intermediate between said inlet and outlet regions and the feature that a cross-sectional increase in said space from the inlet region to the outlet region, measured transverse to the direction of flow of the forwarding phase at least predominates in those parts of the apparatus where material interchange is adapted to take place between the retarding phase and the forwarding phase.

The invention also provides for an inlet device, particularly suitable for use with some embodiments of the apparatus defined above comprising
  a. an inlet chamber;
  b. an impregnating chamber adjoining the inlet chamber;
  c. a porous sampling device comprising a retarding phase adapted to retain a sample to be separated by impregnation, reciprocally movable between the inlet chamber and the impregnating chamber;
  d. an inlet passage for sample material leading into the impregnating chamber;
  e. an inlet passage for forwarding phase leading into the inlet chamber in a position in advance of the one extreme position of the sampling device when inside the inlet chamber in the direction of flow of the forwarding phase prescribed by the inlet; and
  f. means operable to impart reciprocal movement to the sampling device between the inlet chamber and the impregnating chamber.

In the following the invention will be further described by way of example with reference to the accompanying drawings from which further features of the invention will become apparent.

BRIEF DESCRIPTION OF THE DRAWINGS

In the drawings:

FIGS. 1 to 11 represent diagrammatic vertical sections through various embodiments of apparatus in accordance with the invention;

FIG. 15 represents a diagrammatic vertical section through a modification of the apparatus in accordance with FIG. 1;

FIG. 16 represents in vertical section details of an inlet and an outlet system of an apparatus such as illustrated in FIGS. 1 or 15; and FIG. 17 represents a diagrammatic vertical section through yet another embodiment of an apparatus in accordance with the invention.

Figure 11:
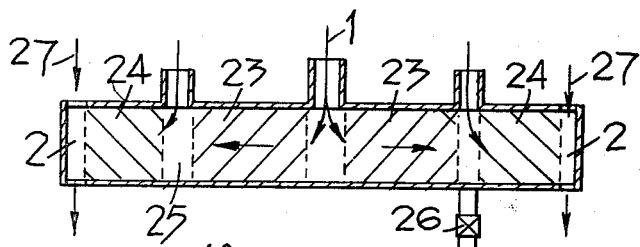

DESCRIPTION OF THE PREFERRED EMBODIMENTS.

Referring to FIG. 1, the apparatus is basically of flat, cylindrical shape, i.e. circular in plan view and has in its central region a central inlet 1 and around its periphery a peripheral outlet 2, the space between which is occupied by a packing 3 comprising a stationary retarding phase. It is essential for the packing 3 to be perfectly uniform throughout, or if there is a change anywhere between the inlet and the outlet, such change must apply identically to all points of the system being equally spaced from the inlet. Thus the packing may consist of a uniform completely open pore foam of synthetic resin or glass or silica. It could also be a statistically uniform porous coherent body of any other suitable kind, e.g., produced by sintering a powder in a statistically uniform well-defined spacial arrangement, e.g., in the metastable condition of loosest packing. A number of suitable packings are described in our pending application.

The surface of the packing may itself be capable of acting as the stationary phase or it is coated with a substance (liquid, gel or solid) capable of acting as such stationary phase.

A non-coherent packing can also be used, provided it is sufficiently uniform, and in that case the packing is supported and partitioned off against the inlet and the outlet respectively by a porous partition.

The outlet 2 may be radially subdivided into segments, each with its own outlet flow control and collecting means, whereby it is nevertheless possible to compensate for an imperfection in the evenness and concentricity of the flow of mobile phase and the emergence of the bands due to any technical flaw whatsoever.

The radial flow through the system is indicated by arrows. For a fair comparison with the prior art the performance of this apparatus should be compared with a cylindrical column of the same volume as the volume of packing 3 and a length equal to the distance between the inlet 1 and the outlet 2, the direction of flow being parallel to the axis of the cylinder. The larger the diameter of the prior art apparatus, the greater will be the improvement in most cases.

Referring now to FIG. 2, a frustoconical column 4 is provided, the axis of the taper being vertical, subdivided horizontally by a plurality of bed supports 5 pervious to the liquid or gaseous mobile phase and impervious to a powder or beads serving as or having coated thereon the retarding phase. The mobile developing phase and the sample to be separated enter through inlet 6, and the outlet is represented by 7. In this example the transverse uniformity in the retarding phase is achieved by maintaining the particulate material between the bed supports in a fluidized, i.e., turbulent, condition, resulting in the substantial flattening of the velocity profile across the column. The outlet need not be a single central pipe nipple as shown. It is also possible to collect the effluent from the column through a plurality of passages or a single annular passage near the periphery of the top of the column.

FIG. 2a is similar to FIG. 2 but the bed supports 5 have been omitted except for a single supporting grid 8 at the bottom of the column. This apparatus may be used with a packing 9 as described with reference to FIG. 1. Alternatively a powder may be employed maintained by the flow of the developing phase throughout in a uniform expanded condition corresponding substantially to the physically defined metastable condition of loosest packing. Again, in this condition the velocity profile is normally found to be completely flat, provided channelling is avoided which usually succeeds well with spherical or near spherical particles. The said condition is best attained by first fluidizing the particulate material completely and then reducing the flow velocity until all turbulence of the particles just ceases, taking care not to reduce said velocity so much that the powder returns to the loosely settled state. The maintenance of an even flow-assisted loosened up condition may be assisted by vibrating the bed by means of vibrator 10.

It is also possible to use the apparatus of FIG. 2a with the packing in a fully fluidized condition in which case the vibrator is designed to produce standing waves in the bed, such that the coarser particles of the bed become concentrated in the nodes of the bed, thereby performing the function of the transverse partitions 5 in FIG. 2.

The flow lines of the forwarding phase in the use of the apparatus of FIG. 2 or 2a will tend to approximate a three-dimensionally radial pattern having a pointlike origin in the apex found by the geometrical extension of the column walls.

Referring to FIG. 3, a packed column with baffles, so-called internals, is shown, which have been inserted to subdivide the column longitudinally into a plurality of consecutive sections 12 having substantially circular peripheral outlines. These internals, in contrast to somewhat similar known internals are arranged to guide the mobile phase (flowing in the direction of the arrow) purely along a radially outwardly directed path whilst in interchange with the packing. The inlet is represented by 11 in an axial position. This is followed alternately by layers of packing 12 and pairs of baffles consisting each of an uninterrupted disc 14 of somewhat smaller diameter than the inner diameter of the column walls 15 and followed after quite a small non-packed gap by an annular baffle 16 having an outer diameter corresponding to the inner diameter of the column walls 15 and a central aperture 17. Immediately preceding the outlet 18, the last impervious disc 14a is followed in close succession by the bottom 16a of the column. This kind of apparatus substantially functions like a succession of the devices in accordance with FIG. 1 connected in series except that in each compartment of the column there is a certain amount of axial flow superimposed upon the predominating radial flow. After each radial outward passage through a layer of packing 12 the mobile phase is guided from the periphery of the column through the narrow gap between baffles 14 and 16 immediately back to the axis of the column to be mixed at 17 and enter into the central region of the next section of packing.

The discs 14 may be affixed to the adjoining baffle 16 in the required spaced relationship or held apart by spacers. In some embodiments a fine annular grid may be provided to prevent the entrance of packing material into the gap between the baffles of a pair. The baffles 14, 16 may be loosely inserted into the column, being merely supported by the packing.

The packing, or at least the stationary phase supported thereon, may differ from one layer 12 to the next if so desired, resulting in different separating conditions. Also successive layers 12 may differ in thickness, in which case it is preferred for an increase in thickness to be provided in the direction of flow.

FIG. 4 represents a refinement of the embodiment in FIG. 3 in which the baffles 14 and 16 are profiled to more closely conform with an idealized flow pattern.

FIG. 5 represents yet another refinement of the embodiment in accordance with FIG. 3 in which central and peripheral passages 19 and 20 respectively are provided for each packing layer 12 to more perfectly guide the mobile phase along an outwardly directed radial path in each layer. These passages may be formed in the same manner as in the case of the inlet and outlet passages of FIG. 1, and the same comments may apply to the packing itself as in the case of either FIGS. 1 or 3 and are aligned with the central apertures of the annular baffles and the outer peripheries of the continuous baffles respectively.

Referring to FIG. 6 the arrangement is identical with FIG. 5 except for the use of a special packing in the form of bristles or whiskers of any suitable material fixed to each baffle 16 and directed on the average parallel to the axis of the column.

Referring to FIG. 7 a modification of the embodiment of FIG. 5 uses central baffles 14 thicker in the center than at their margins. The annular baffles 16 are funnel-shaped. Accordingly the thickness of each layer 12 of packing increases from the axis of the column outwardly.

Referring to FIG. 8, this shows a further development of the concept of FIG. 7, wherein funnel-shaped annular baffles 16 alternate with dish-shaped baffles 14 so orientated that alternatingly the concave sides and the convex sides of successive baffles face each other. This time all gaps 12 and 12a between any two baffles are occupied by column packing, the flow path in layers 12 being radially outwards whilst that in layers 12a is radially inwardly directed. However, the inclination of the baffles are so dimensioned that the increase in the thickness of each layer 12a from the margin towards the center is enough at least to partly compensate or even more than compensate for the convergence of the flow lines in plan view.

Referring now to FIG. 9, the concept in accordance with FIG. 8 has been further developed in that the baffles are so arranged that the mobile phase is directed alternatingly radially outwards and radially inwards but that there is an increase in the cross-section of packing traversed by the mobile phase throughout the apparatus, by virtue of an increase in the spacing between successive baffles. Thus the first layer of packing 12 takes the form of a flat disc. The second layer 12b has a peripheral thickness equal to the thickness of layer 12 and its thickness increases towards the axis of the column. The third layer 12c in which the direction of flow is once again outwardly directed has a central thickness corresponding to the central thickness of layer 12b said thickness increasing towards the margin (or remaining constant if so preferred) whilst the fourth layer 12d in which the direction of flow is once again radial towards the axis of the apparatus begins at its margin with the marginal thickness of layer 12c and terminates with a central portion of considerably increased thickness. In layer 12d the peripheral and central outlines 21 of the packing have been curved to approximate the shape of the streaming profile. In addition the apparatus comprises a second inlet 11a for the introduction of additional eluent material preceding section 12c.

Referring now to FIG. 10 the apparatus is similar to that in accordance with FIG. 1, however, the central inlet chamber 1a has a considerable radius $r_1$. In this manner the ratio between maximum radius $r_2$ of the packing and minimum radius $r_1$ can be limited in accordance with the desired maximum and minimum flow velocities for the particular system. The inlet means for the introduction of the sample are generally indicated by 1b and will be described in greater detail with reference to FIG. 16. The outlet 2 leads into a plurality of outlet capillaries 22 which all guide the eluate towards a central collecting locality. Each capillary may have a separate built-in detector and a valve or like flow control means to allow the separate monitoring and correction if necessary of the arrival of bands in each capillary.

Referring now to FIG. 11, the arrangement in accordance with FIG. 1 has been modified by the provision of two concentric rings of packing 23 and 24 differing from one another and separated by an annular inlet passage 25 for the introduction of additional or different eluent. The passage 25 may in addition be provided with a valve controlled outlet 26 by means of which it is possible if so desired to collect an eluate after passage through packing 23 and without allowing it to enter into packing 24.

The peripheral outlet 2 has been modified by making provision for the introduction (arrows 27) of a flushing fluid for rapidly washing out the eluate as it arrives in peripheral passage 2 and as shown again in FIG. 16.

Figure 12:
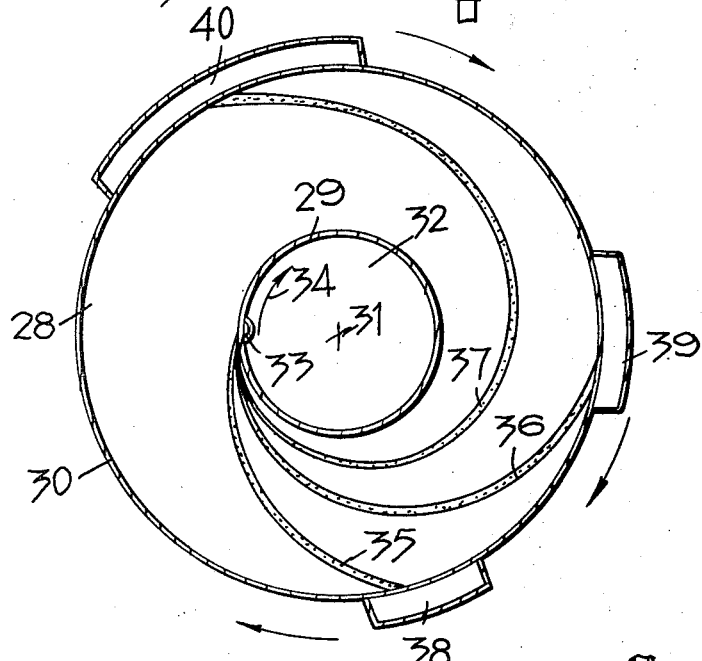
FIG. 12 represents a plan view (diagrammatic) of a continuous chromatographic apparatus in accordance with the invention.

Referring now to FIG. 12 the inner and outer outlines of an annular disc-shaped packing 28 in the form of a three-dimensionally substantially uniformly porous bed are represented by 29 and 30 respectively and the central axis of the apparatus is indicated by 31 passing through the center of inlet chamber 32 which is maintained filled with eluent. The bed is sandwiched between confinements parallel to the paper planes. A sample introducing hemicapillary is represented by 33 and moves along outline 29 of the packing in the direction of arrow 24 around the axis of rotation 31 continuously introducing sample material into the packing 28 whilst eluent continuously enters into the packing through the remainder of inner periphery 29 which at any given moment is not covered by the hemi-capillary 33. The bands 35, 36 and 37 of sample being separated are thus developed in a helical pattern having at each moment its origin at the position occupied by hemi-capillary 33 whilst the opposite ends of the bands also occupy a substantially constant position on the outer periphery 30 relative to point 33. Accordingly the individual bands are collected by fraction cutters 38, 39 and 40 which, as indicated by arrows, revolve around axis 31 at the same angular velocity as the sample inlet 33. The apparatus, however, makes allowance for correction of the relative positions of fraction cutters 38, 39 and 40 to allow for any imperfections in the development of the chromatogram. The remainder of the periphery 30 of packing 28 is in communication with peripheral eluate collecting means not shown from which the eluent, if so desired, may be recovered.

Figure 13:
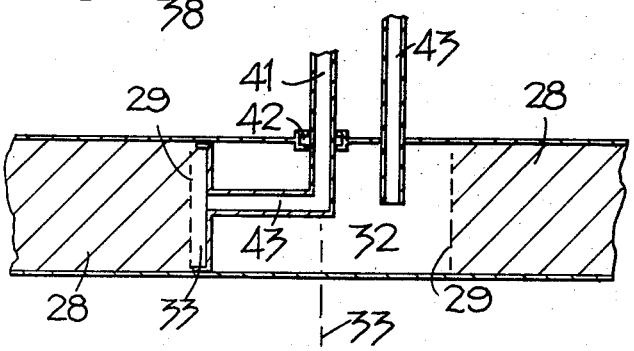
FIG. 13 shows a diagrammatic detail of the inlet of the apparatus in FIG. 12 in vertical section.

In FIG. 13 the inlet part of the apparatus in accordance with FIG. 12 is shown in diagrammatical vertical section. The sample inlet tube 41 coincides with the axis of rotation 33 of the apparatus and passes through a central seal 42 constructed in the manner of an oil seal and leading into a radially directed arm 43 through which the sample enters into the hemi-capillary 33, the open side of which is in communication with packing 28 through the porous inner periphery thereof indicated by dotted line 29. Pipe 41 may be connected to suitable driving means for imparting rotation to the sample inlet relative to the packing if the latter is stationary. The eluent is introduced into inlet chamber 32 through an inlet tube 43 at a pressure substantially the same as the pressure of sample introduction or a pressure minutely higher to prevent leakage of the sample from the hemi-capillary 33 into the inlet chamber 32.

It does not matter in principle whether the sample inlet and fraction cutters are stationary and the packing revolves for vice versa, through the former is preferred. Suitable means operable to impart the rotary movement will be readily apparent to those skilled in the art and require no illustration, one example being a miniature motor engaging via a set of reduction gears a ring gear on the periphery of the casing containing the packing.

Figure 14:
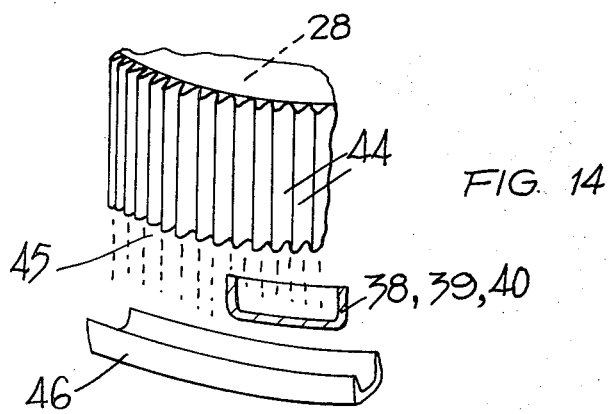
FIG. 14 shows diagrammatically in perspective part of the outlet of an embodiment in accordance with FIG. 12.

Referring now to FIG. 14 part of the outer periphery of the apparatus in FIG. 12 is shown diagrammatically in one version thereof and is formed by a plurality of hemi-capillaries 44 arranged side by side and into which the eluate from the packing 28 feeds. In order to simplify the illustration of the principle of this embodiment it is assumed that the eluate is liquid and falls freely (45) into an annular collecting channel 46 designed to collect all the eluate except for the desired fraction or fractions which are collected by at least one or another appropriate number of fraction cutters 38, 39, 40 revolving jointly with the revolving sample inlet relative to the packing and which are designed to catch the desired fractions before they reach channel 46 and to pass such fraction into suitable collecting containers through tubes not shown.

The means 38, 39, 40 can, of course, also be combined in a single unit with channel 46, this unit then taking the form of an annular passage subdivided into discrete sections, and where such is desirable or required, e.g. in the case of gas chromatography it is possible for this annular passage to be arranged in sliding and sealing relationship to the outlet ends of the hemi-capillaries 44. Such annular passage may be subdivided into any desired number of discrete sections each with its individually controllable outlet means. It is furthermore envisaged that each hemi-capillary 44 may incorporate individually suitable sensing means of any detector means suitable for following the progress of the particular chromatogram, e.g. pairs of electrodes for use in a detector system such as described in our applications.

These sensing means may be permanently connected or adapted to be temporarily connected to suitable measuring means or recording means whereby it is possible to follow the progress of the chromatogram at each point of the periphery and make adjustments, e.g., with regard to the position of the fraction collectors when such is necessary.

Referring now to FIG. 15, the arrangement is substantially similar to FIG. 1 except that the packing 47 increases in thickness towards the outer periphery. It will also be noted that the inner and outer peripheries of the packing 47 are spherically curved around a common center of curvature coinciding with the center point 48 towards which the upper and lower sides 49 and 50 of the apparatus taper as well. The flow lines of the forwarding phase will emanate radially from point 48.

Referring now to FIG. 16 showing in more detail an inlet device for an apparatus such as illustrated in FIG. 10 the inlet chamber 1a is adjacent an impregnating chamber 51 partitioned concentrically by a reciprocally movable sampling device 52 illustrated in the process of being impregnated with sample. The latter takes the form of an annular chamber having porous cylindrical walls 53, the intervening space being filled with a packing 54 capable of retaining a sample to be separated, be it by adsorption, solution, ion exchange or any equivalent process. The sample in liquid or gaseous form is circulated through this packing 54 entering through inlet 55 and leaving through the outlet 56 of the impregnating chamber until the packing 54 is completely impregnated. In the meantime a suitable eluent is kept entering through the eluent inlet pipe 57 into chamber 1a, passing through the packing 3 and out through peripheral outlet 2 to eluate a previously introduced sample. The pressure in chamber 1a is maintained very slightly higher than in chamber 51 to avoid leakage of sample fluid into chamber 1a.

After completion of the elution and after complete impregnation to the desired extent has been achieved in impregnating chamber 51, the push rod 58 (of which only one is shown but of which several may be provided suitably distributed) is actuated to push the sampling device 52 with the sample through annular slot 59 into chamber 1a into the position indicated by dotted lines 52a where it now in effect becomes part of the packing 3 and immediately the eluent (forwarding phase) will now flow through the porous walls 53 and the packing 54 before entering packing 3, whereby the sample is transferred by elution into packing 3 where the chromatographic separation of the sample proceeds as the eluent flows radially through the disc-shaped packing 3.

After elution has been in progress for some time the sampling chamber 52 with the annular section of packing 54 may be pulled back by means of rod 58 into the position shown in FIG. 16 for a further impregnating and sample taking step and repetition of the cycle. Alternatively, e.g., before impregnating with a new sample it is possible first to strip by means of a strong eluent the sampling device 52 inside the impregnating chamber of any strongly retained substance which up to that stage has not yet been eluted.

Referring now to FIG. 17, the apparatus consists of a spherical inlet chamber 59 in the center of a spherical body of packing 60 held centrally positioned inside the spherical walls 61 of the apparatus of slightly larger radius by radial positioning fins 62, which simultaneously subdivide the peripheral outlet space 63 into an appropriate number of sections each having a separately controlled outlet 64.

The inlet chamber 59 is fed with sample and eluent through an inlet tube 65. This device is designed to operate without any wall effect since it is completely devoid of any column wall. The flow lines of the forwarding phase will radiate from a pointlike origin coinciding with the center of the apparatus. Again it is possible in practice to connect several such spherical separating devices in series.

Many additional advantageous modifications will become apparent to those skilled in the art by reading the above description of the preferred embodiments in conjunction with the preceding more general summary of the invention.

What we claim is:

1. A chromatographic separating process involving differentiated distribution of the components of a mixture between a retarding phase and a forwarding phase, the latter phase flowing relative to the former phase, carried out with the retarding phase maintained in at least one porous mass pervious to the forwarding phase of a shape defined by three dimensions of substantial magnitude which comprises
   feeding the forwarding phase through said at least one porous mass to achieve a net effect of increasing cross-sectional area of the flow path of the forwarding phase through the porous mass in intimate contact with the retarding phase; and
   while so feeding, subjecting the forwarding phase to repeated flow profile straightening effects.

2. A process as claimed in claim 1 which comprises feeding the forwarding phase through a retarding phase packing of continuously increasing cross-section.

3. A process as claimed in claim 2 which comprises preparing a substantially three-dimensionally uniformly porous disc having a circular periphery and comprising the retarding phase and feeding the forwarding phase from the central region of such disc radially towards the periphery.

4. A process as claimed in claim 3 which comprises removing from said central region an annular section of said disc, impregnating the annular section with a mixture to be separated, returning the impregnated section to its original position in the disc and feeding the forwarding phase from the axial region of the annular section radially through the latter and into and through the disc.

5. A process as claimed in claim 1 which comprises subdividing longitudinally a chromatographic column packing into a plurality of consecutive sections of substantially circular peripheral cross-sections and feeding the forwarding phase successively through said sections by introducing the forwarding phase in the central region of each section and feeding the forwarding phase radially towards the periphery of the section and from there immediately into the central region of the next section.

6. A process as claimed in claim 5 which comprises maintaining different separating conditions in consecutive sections in terms of the combination of parameters consisting of the flow velocity, temperature, and characteristics of the two phases.

7. A process as claimed in claim 1 which comprises feeding the forwarding phase along a path defined by flow lines radiating three-dimensionally substantially from a pointlike origin.

8. A process as claimed in claim 1 which comprises injecting additional forwarding phase between successive sections of increasing cross-sectional area in the direction of flow.

9. A process as claimed in claim 1 which comprises confining a substantially uniformly porous bed having essentially the texture of an open-pore foam comprising the retarding phase in a space having the shape of a body of rotation, continuously introducing into the bed a mixture to be separated at a locality maintained travelling at a constant rate along a path of constant distance from the axis of the body of rotation, feeding forwarding phase at a constant rate radially uniformly from the central region of the body of rotation towards its periphery and collecting tractions at localities travelling around the periphery at the same angular velocity as that of the locality of introduction of the mixture.

10. The process according to claim 1 wherein the profile straightening effects are produced by exposing the retarding phase on the pore surfaces of a porous mass of which the porosity characteristics are statistically uniform at least across said flow path.

11. The process according to claim 10 wherein the porous mass has essentially the texture of an open-pore foam.

12. The process according to claim 1 wherein the profile straightening effects are produced by feeding the forwarding phase through the porous mass under convective flow conditions.

13. The process according to claim 1 wherein the profile straightening effects are produced by feeding the forwarding phase alternatingly through sections of the porous mass and open connecting passages wherein transverse mixing of the forwarding phase is brought about.

14. The process according to claim 13 which comprises feeding the forwarding phase radially from the central regions of the sections outwards towards the outer regions of the sections and feeding the forwarding phase from said outer regions through the open passages to the central regions of the respective next following sections.

15. The process according to claim 14 wherein successive sections are of increasing average cross-sectional area, measured transverse to the direction of feeding through the sections.

16. The process according to claim 15 wherein an additional stream of forwarding phase is fed into at least one of said open passages between successive sections of increasing average cross-sectional area.

17. The process according to claim 16 wherein the composition of the additional stream differs from the initial composition of the forwarding phase to which it is added.

18. A process as claimed in claim 1 which comprises confining the porous mass in an essentially frustoconical space and feeding the forwarding phase in the direction of increasing cross-section of the space.

19. A process as claimed in claim 1 which comprises maintaining a bed of powder, the surface of the particles of which comprises the retarding phase in the said space of which the axis is vertical and the apex is downwardly directed and feeding the forwarding phase through the powder at a rate adjusted to maintain the powder in a quiescent essentially uniform expanded condition essentially corresponding to the physically defined metastable condition of loosest packing and simultaneously developing the chromatogram in said bed.

20. A process as claimed in claim 1 which comprises confining the porous mass in a space bounded by outlines of a sphere and feeding the forwarding phase radially uniformly through the porous mass from the central region of the sphere.

21. A chromatographic separating process involving differentiated distribution of the components of a mixture between a retarding phase and a forwarding phase, the latter phase flowing relative to the former phase carried out with the retarding phase exposed to the forwarding phase on the pore surfaces of a porous mass pervious to the forwarding phase and which comprises:
 a. removing from said porous mass a section;
 b. impregnating the section with the mixture;
 c. returning the impregnated section to its original position relative to the remainder of the porous mass;
 d. feeding the forwarding phase through the section and from there into and through said remainder of the porous mass.

22. A process according to claim 21 wherein the porous mass is annular, having circular outlines, said section also being annular and being removed from the central region of the porous mass for said impregnating and returned to that region whereafter said feeding takes place from the axial region of the section radially through the latter and into and through the porous mass.

23. A chromatographic apparatus which comprises an inlet region for a chromatographic forwarding phase, an inlet for material to be separated, an outlet region, a space intermediate between said inlet and outlet regions defined by three dimensions of substantial magnitude filled with a three dimensionally interleadingly porous separating medium comprising a retarding phase, there being a cross-sectional increase in said space from the inlet region to the outlet region, measured transverse to the direction of flow of the forwarding phase at least predominating in the sum total of those parts of the apparatus occupied by the retarding phase, and means for smoothing flow profile effects of the forwarding phase.

24. An apparatus as claimed in claim 23 in the form of a packed chromatographic column divided by transverse baffles into packed sections, said baffles defining a path of flow for the forwarding phase through the packing containing the retarding phase with a nett increase in cross-sectional area of the path.

25. An apparatus as claimed in claim 24 comprising in repeated succession an annular baffle extending from the column walls towards a central aperture representing the inlet for forwarding phase into a section of packing following said annular baffle, followed in turn by a continuous baffle of smaller diameter than the internal diameter of the column providing a peripheral outlet between the uninterrupted baffle on the column wall leading from said section into an open gap followed by the next annular baffle of the succession.

26. An apparatus as claimed in claim 25 in which the sections of packing are themselves annular with an inner periphery substantially aligned with the inner periphery of the annular baffle adjoining the section at one end and an outer periphery substantially aligned with the outer periphery of the uninterrupted baffle adjoining the section at the other side.

27. An apparatus as claimed in claim 23 in which the said cross-sectional increase is in two dimensions.

28. An apparatus as claimed in claim 23 in which said separating medium comprising the retarding phase is present in the form of an integral coherent body having a statistically uniform pore structure.

29. An apparatus as claimed in claim 23 wherein the means for smoothing flow profile effects are provided by said porous separating medium having essentially the texture of an open-pore foam of essentially uniform porosity characteristics.

30. An apparatus as claimed in claim 29 wherein the porous separating medium comprises a polymeric material.

31. An apparatus as claimed in claim 23 comprising a three-dimensionally substantially uniformly porous bed, having essentially the texture of an open-pore foam comprising a retarding phase sandwiched between a pair of opposite walls and the bed between said walls having the shape of a body of rotation, a central inlet chamber between the walls coaxial with the axis of the body of rotation and having outlines essentially equidistant from the outlines between said walls of the body of rotation and peripheral outlet means around essentially the entire outer periphery of the body of rotation between said walls.

32. An apparatus as claimed in claim 31 in which the inlet chamber is adjoined by an impregnating chamber and which further comprises an annular porous sampling device adapted to retain a sample and concentric about the axis of the body of rotation, reciprocally movable between the impregnating chamber and the inlet chamber, an inlet passage for sample material leading into the impregnating chamber, an inlet passage for forwarding phase communicating with the central region of the inlet chamber and means operable to impact said reciprocal movement to the sampling device.

33. An apparatus as claimed in claim 31 adapted for continuous chromatography comprising:
 a sample inlet inside the inlet chamber in communication with and abutting against a portion of the inner periphery of the body of rotation and rotatable relative thereto about its axis;
 at least one fraction cutter associated with the peripheral outlet means adapted to receive the eluate from a limited portion of the outer periphery of the body of rotation and rotatable relative thereto about its axis in synchronism with the rotary movement between the sample inlet and the body of rotation; and
 means for bringing about said rotating movement.

34. An inlet for a chromatographic apparatus which comprises:
 a. an inlet chamber;
 b. an impregnating chamber adjoining the inlet chamber;
 c. a porous sampling device comprising a retarding phase adapted to retain a sample to be separated by impregnation, reciprocally movable between the inlet chamber and the impregnating chamber;
 d. an inlet passage for sample material leading into the impregnating chamber;
 e. an inlet passage for forwarding phase leading into the inlet chamber, positioned to direct the forwarding phase through a space reserved for the sampling device inside the inlet chamber and
 f. means operable to impart reciprocal movement to the sampling device between the inlet chamber and the impregnating chamber.

35. In a chromatographic apparatus having inlet and outlet means the improvement of a chromatographic column comprising:
 a. a plurality of annular axially aligned sections of column packing material, each bordered at opposite ends by one baffle;
 b. one baffle being annular and extending from the walls of the column towards a central aperture aligned with the inner periphery of the adjoining annular section;
 c. the other baffle being continuous, in the region thereof adjoining the annular section, but terminating in peripheral passage means adjoining the column walls;
 d. a peripheral gap between each annular section and said column walls communicating with the adjoining passage means; and
 e. an open gap between the baffles bordering successive annular sections and forming an open passage from the peripheral gap surrounding one of said successive annular sections to the inner periphery of the next following annular section.

36. A chromatographic apparatus comprising a suitable porous packing comprising a retarding phase confined in an annular space surrounding a central inlet chamber and outlet means on the outer periphery of the annular space, wherein the inlet chamber is adjoined by an impregnating chamber and which further comprises an annular porous sampling device adapted to retain a sample and concentric about the axis of the body of rotation, reciprocally movable between the impregnating chamber and the inlet chamber, an inlet passage for sample material leading into the impregnating chamber, an inlet passage for forwarding phase communicating with the central region of the inlet chamber and means operable to impart said reciprocal movement to the sampling device.

37. In a chromatographic apparatus having inlet and outlet means, the improvement of a chromatographic column having:
 a. successive open central flow passages alternating with baffle formations across said flow passages; and b. at least one annular porous body having the texture of an open-pore foam surrounding at least one of said successive open central flow passages.

* * * * *